US010370986B2

(12) United States Patent
Heitman et al.

(10) Patent No.: US 10,370,986 B2
(45) Date of Patent: Aug. 6, 2019

(54) NOZZLE AND NOZZLE ASSEMBLY FOR GAS TURBINE ENGINE

(71) Applicant: General Electric Company, Schenectady, NY (US)

(72) Inventors: Bryce Loring Heitman, Cincinnati, OH (US); Gregory Scott Phelps, Cincinnati, OH (US); Darrell Glenn Senile, Oxford, OH (US)

(73) Assignee: General Electric Company, Schenectady, NY (US)

(*) Notice: Subject to any disclaimer, the term of this patent is extended or adjusted under 35 U.S.C. 154(b) by 723 days.

(21) Appl. No.: 14/807,998

(22) Filed: Jul. 24, 2015

(65) Prior Publication Data
US 2017/0022828 A1   Jan. 26, 2017

(51) Int. Cl.
*F01D 9/02* (2006.01)
*F01D 25/24* (2006.01)
*F01D 9/04* (2006.01)

(52) U.S. Cl.
CPC .......... *F01D 9/02* (2013.01); *F01D 9/042* (2013.01); *F01D 25/246* (2013.01); *F05D 2220/32* (2013.01); *F05D 2300/10* (2013.01); *F05D 2300/6033* (2013.01); *Y02T 50/672* (2013.01)

(58) Field of Classification Search
CPC .......... F01D 9/02; F01D 9/042; F01D 25/243; F01D 25/246; F01D 5/282; F01D 5/284; F05D 2300/6033
See application file for complete search history.

(56) References Cited

U.S. PATENT DOCUMENTS

| 4,126,405 A | * | 11/1978 | Bobo | ..... F01D 9/042 415/115 |
| 4,815,933 A | | 3/1989 | Hansel et al. | |
| 5,332,360 A | | 7/1994 | Correia et al. | |
(Continued)

FOREIGN PATENT DOCUMENTS

JP   2012530212 A   11/2012

OTHER PUBLICATIONS

European Search Report and Opinion issued in connection with corresponding European Application No. 6180412.5 dated Nov. 24, 2016.
(Continued)

*Primary Examiner* — Logan Kraft
*Assistant Examiner* — Elton Wong
(74) *Attorney, Agent, or Firm* — General Electric Company; William Andes

(57) ABSTRACT

Nozzles and nozzle assemblies for gas turbine engines are provided. A nozzle includes an airfoil having an exterior surface defining a pressure side and a suction side extending between a leading edge and a trailing edge, an outer band disposed radially outward of the airfoil, the outer band including a radially outwardly-facing end surface, and an inner band disposed radially inward of the airfoil, the inner band including a radially inwardly-facing end surface. The nozzle further includes a flange extending radially from one of the radially outwardly-facing end surface or the radially inwardly-facing end surface. The flange is formed from a ceramic matrix composite material and includes a plurality of ceramic matrix composite plies stacked together and generally having an L-shape in a circumferential cross-sectional view.

14 Claims, 8 Drawing Sheets

(56) References Cited

U.S. PATENT DOCUMENTS

| | | |
|---|---|---|
| 7,824,152 B2 | 11/2010 | Morrison |
| 8,636,466 B2 | 1/2014 | Cortequisse |
| 8,834,109 B2 | 9/2014 | Propheter-Hinckley |
| 9,022,733 B2 | 5/2015 | Coupe et al. |
| 2004/0120811 A1 | 6/2004 | Darkins et al. |
| 2007/0084052 A1 | 4/2007 | Henrich et al. |
| 2011/0008156 A1* | 1/2011 | Prentice ............... F01D 5/282 |
| | | 415/200 |
| 2012/0251314 A1 | 10/2012 | Beaujard et al. |
| 2013/0034434 A1 | 2/2013 | Propheter-Hinckley |
| 2014/0314556 A1 | 10/2014 | Fremont et al. |
| 2015/0056080 A1 | 2/2015 | Hogberg et al. |
| 2015/0247412 A1* | 9/2015 | Le Hong ............... F01D 5/282 |
| | | 416/230 |

OTHER PUBLICATIONS

Unofficial English Translation of Japanese Office Action issued in connection with corresponding JP Application No. 2016139948 dated Jul. 18, 2017.

* cited by examiner

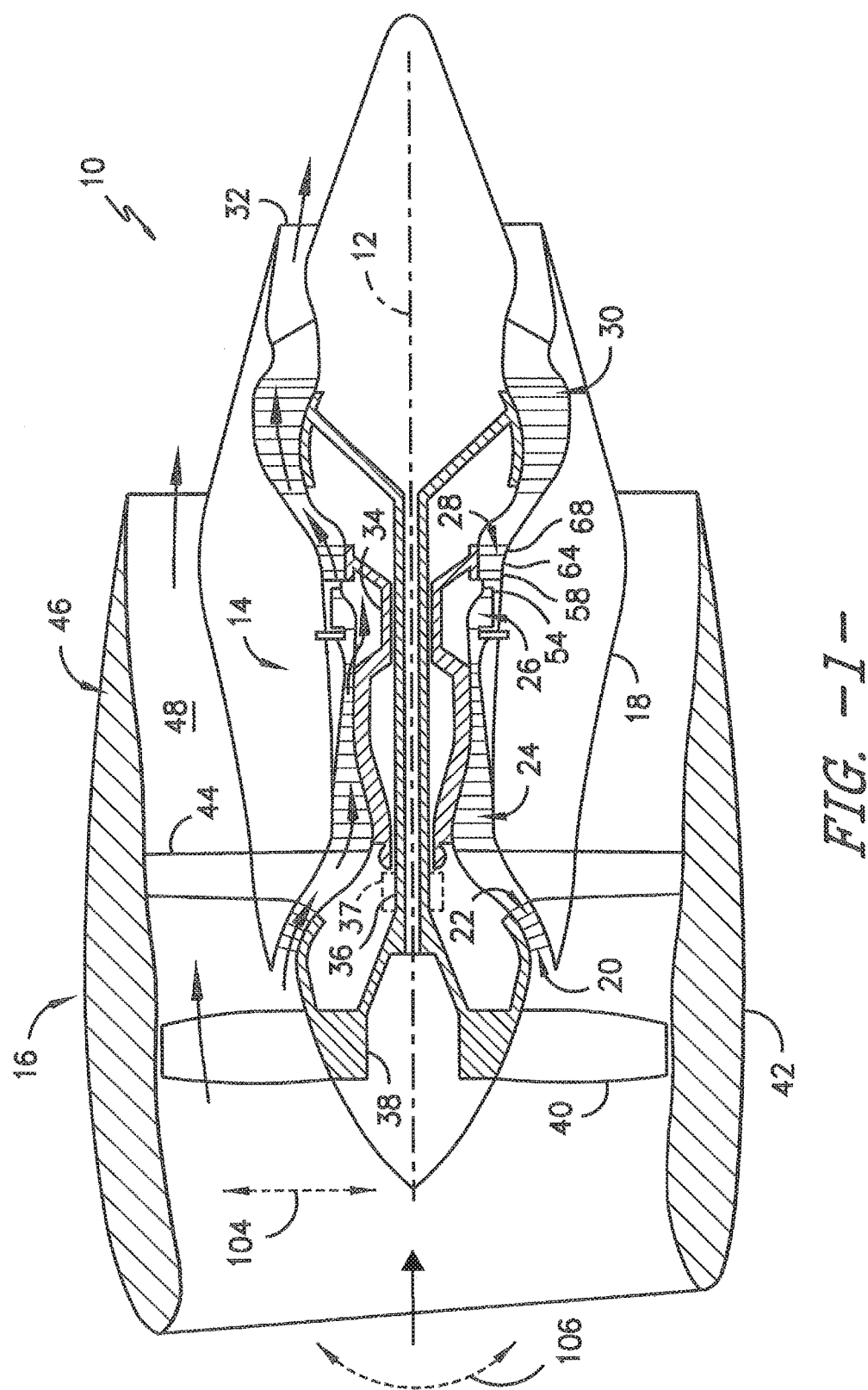

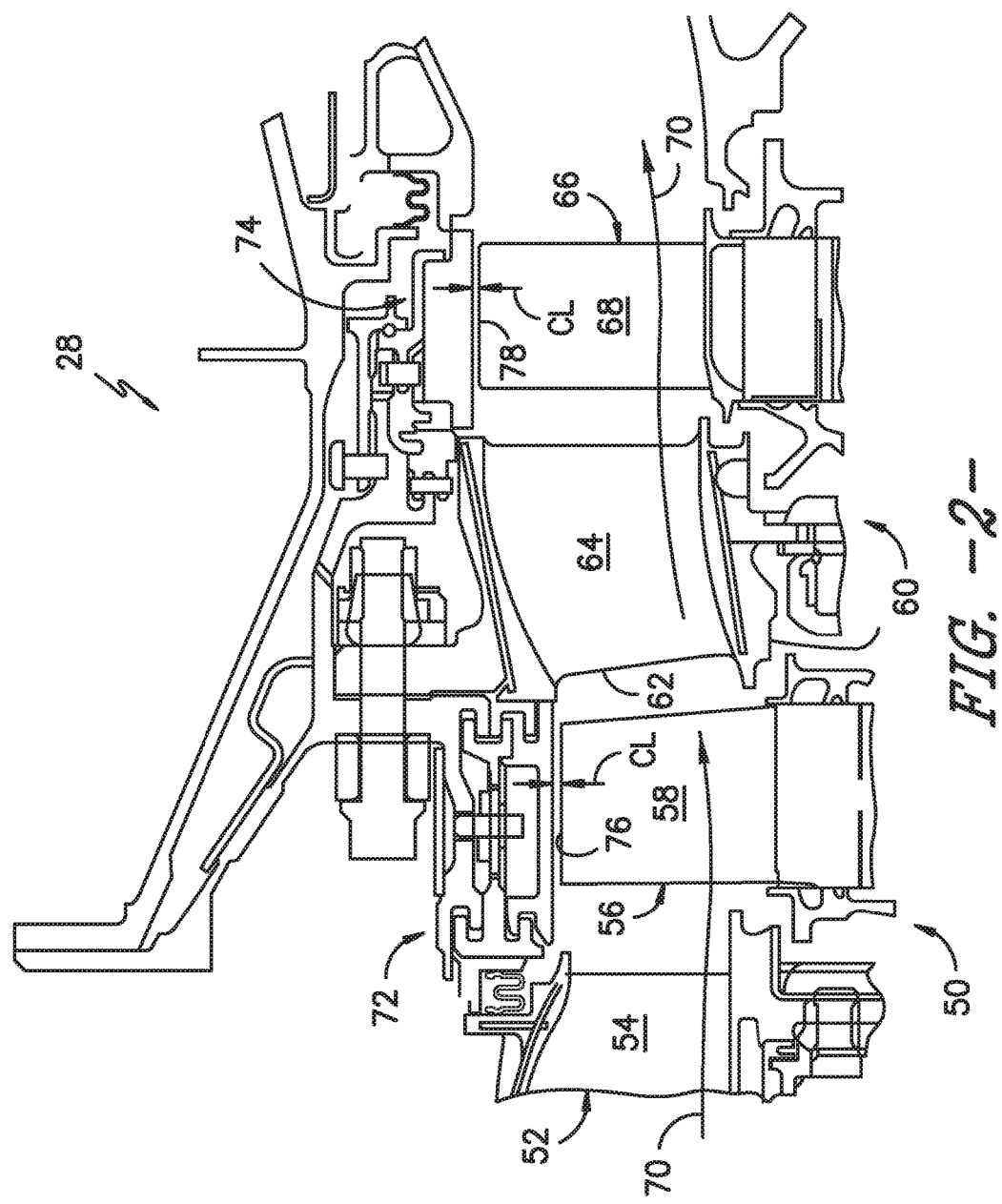

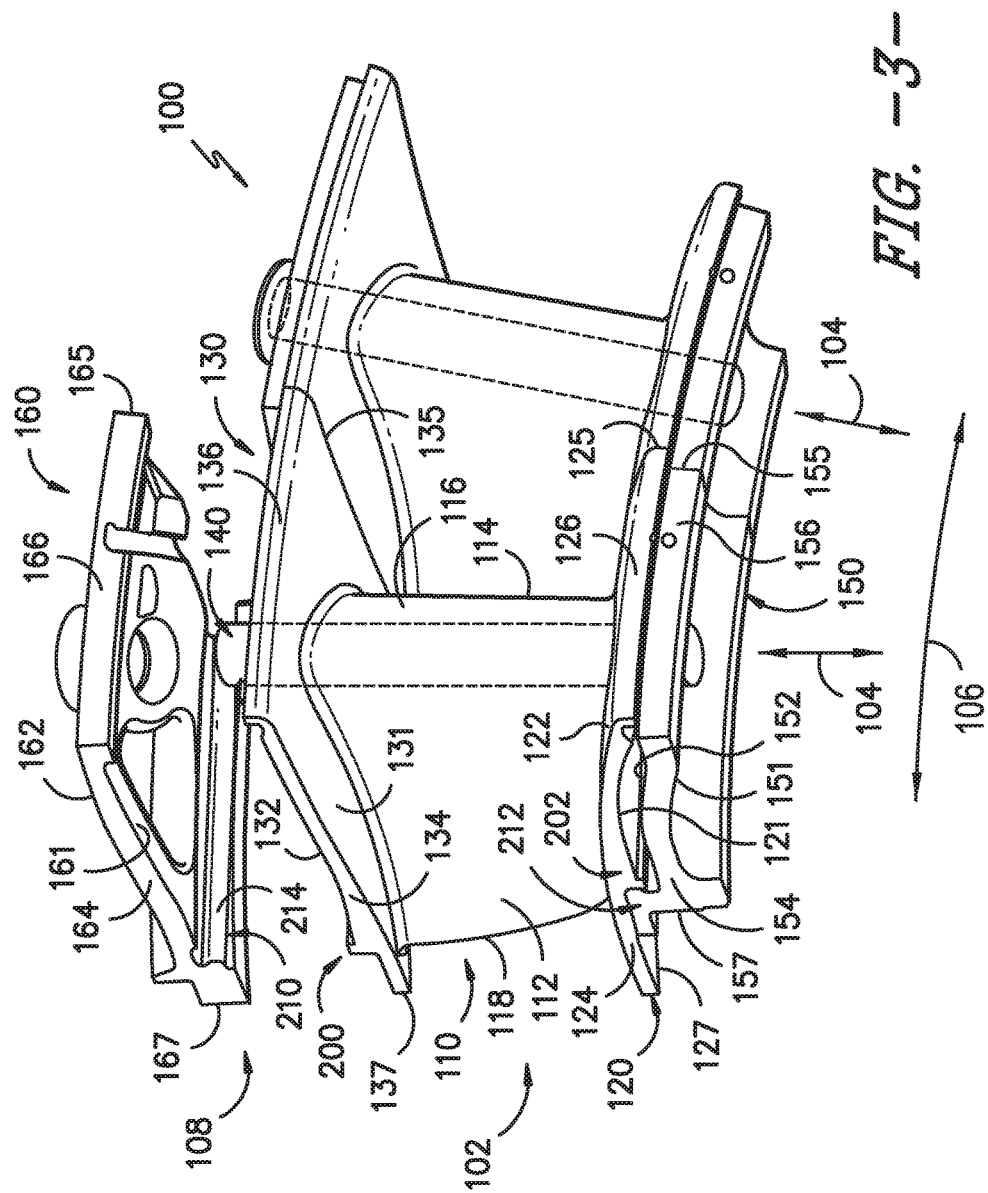

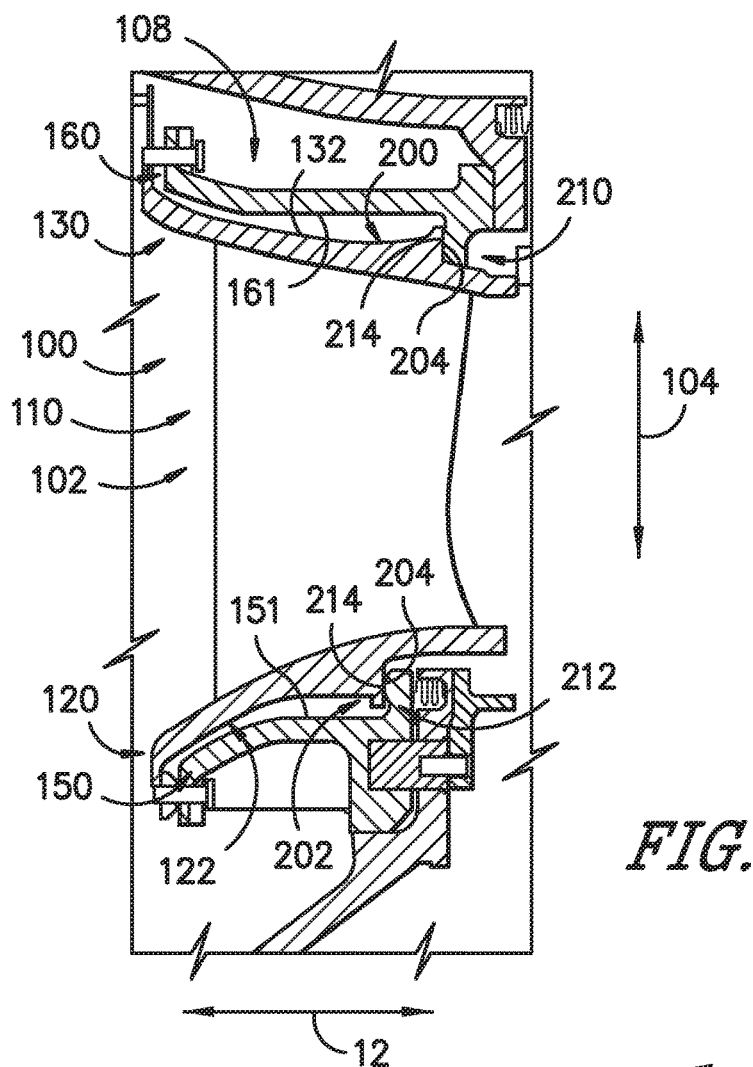
FIG. -4-
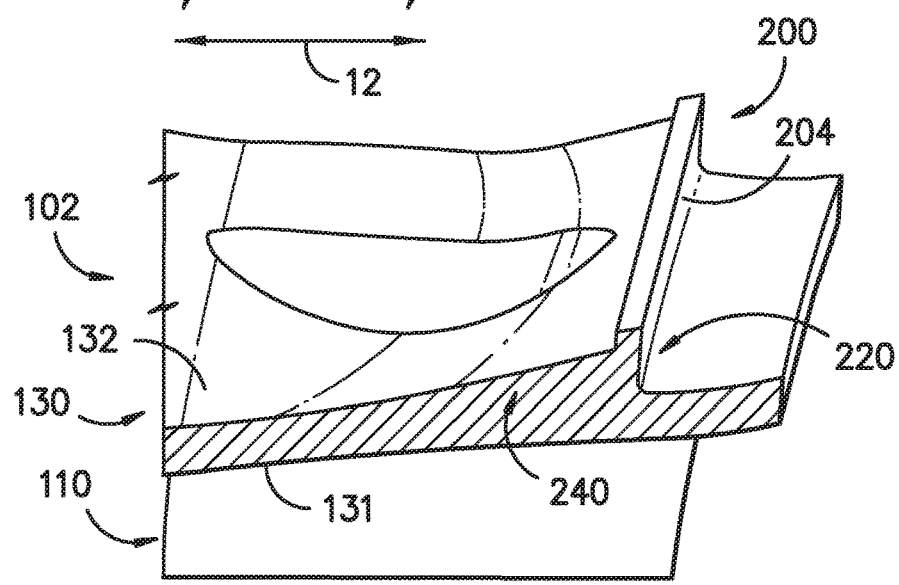
FIG. -5-

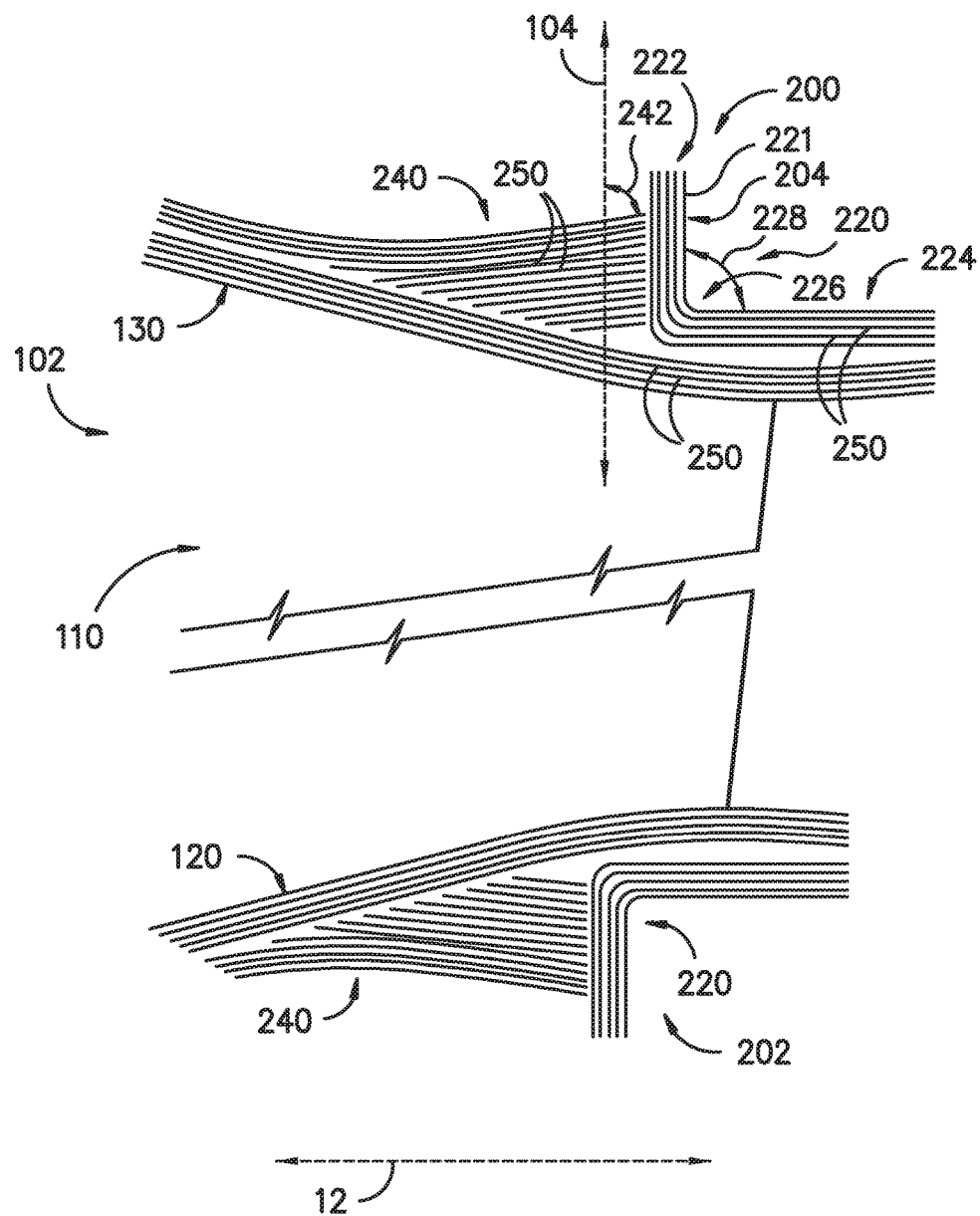
FIG. -6-

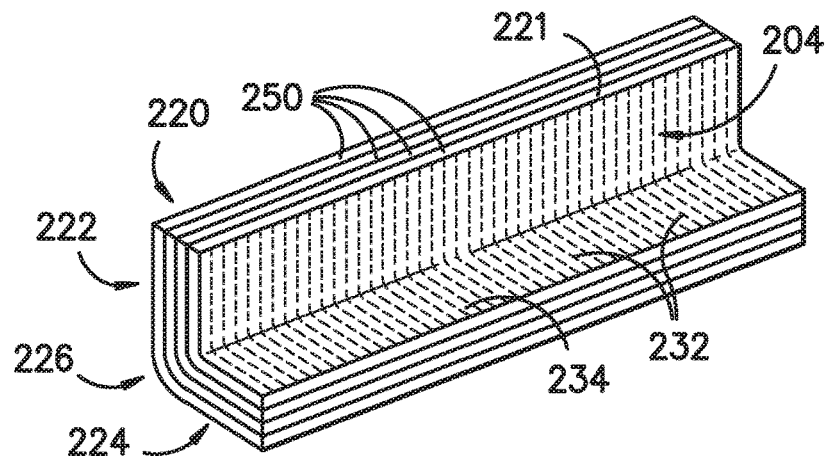
FIG. -7-
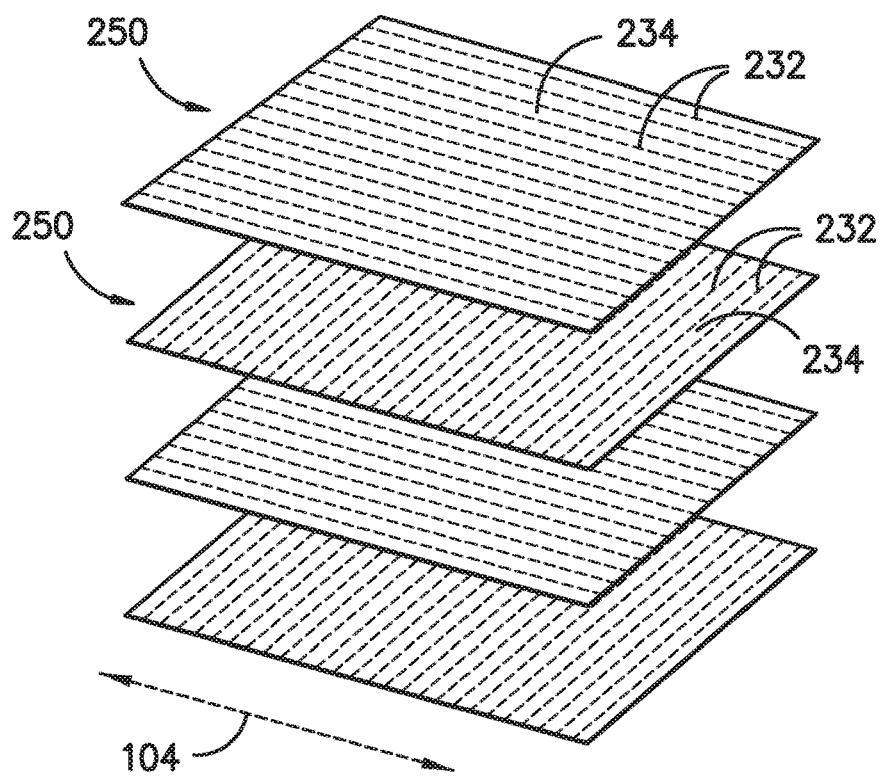
FIG. -8-

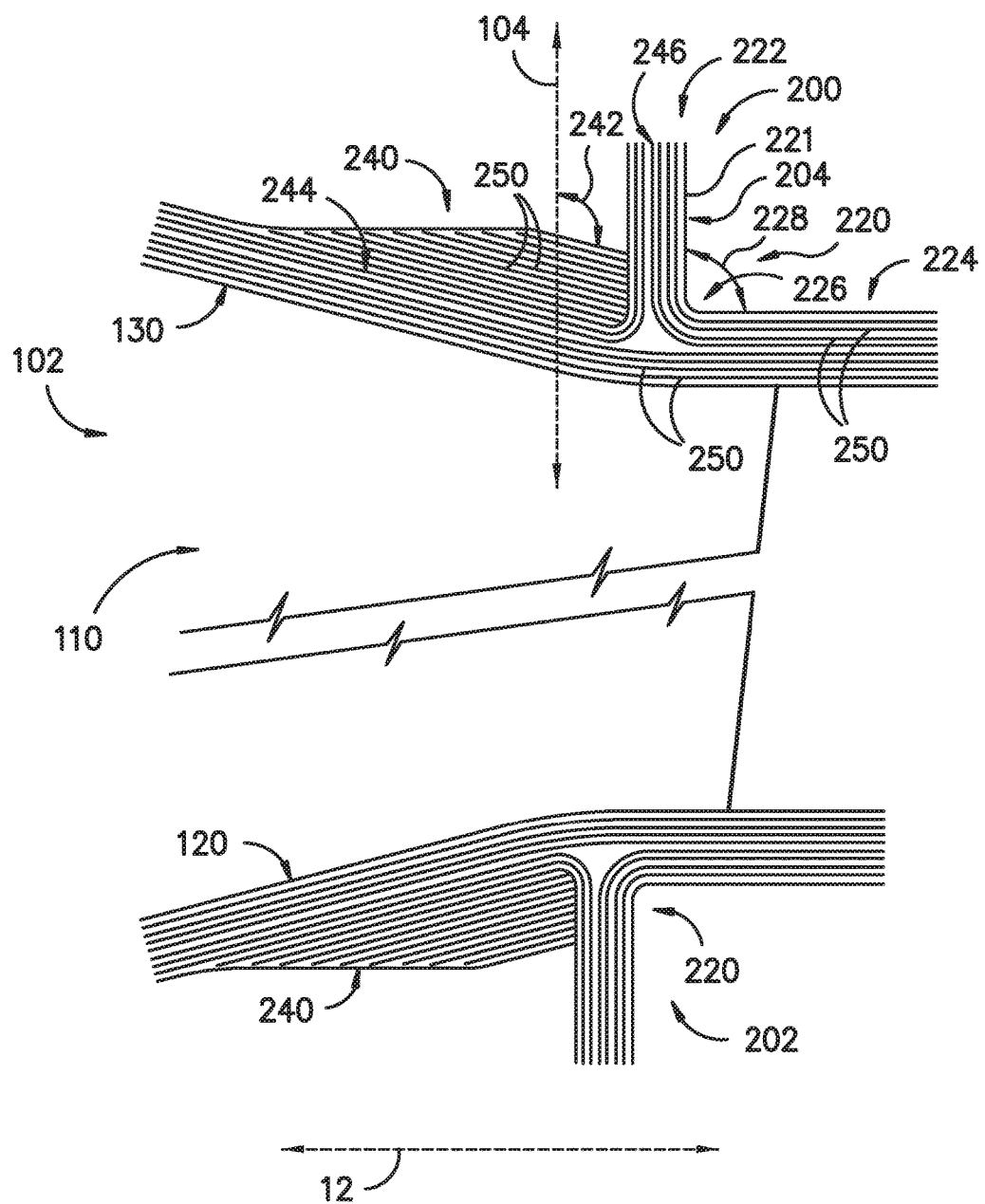
FIG. -9-

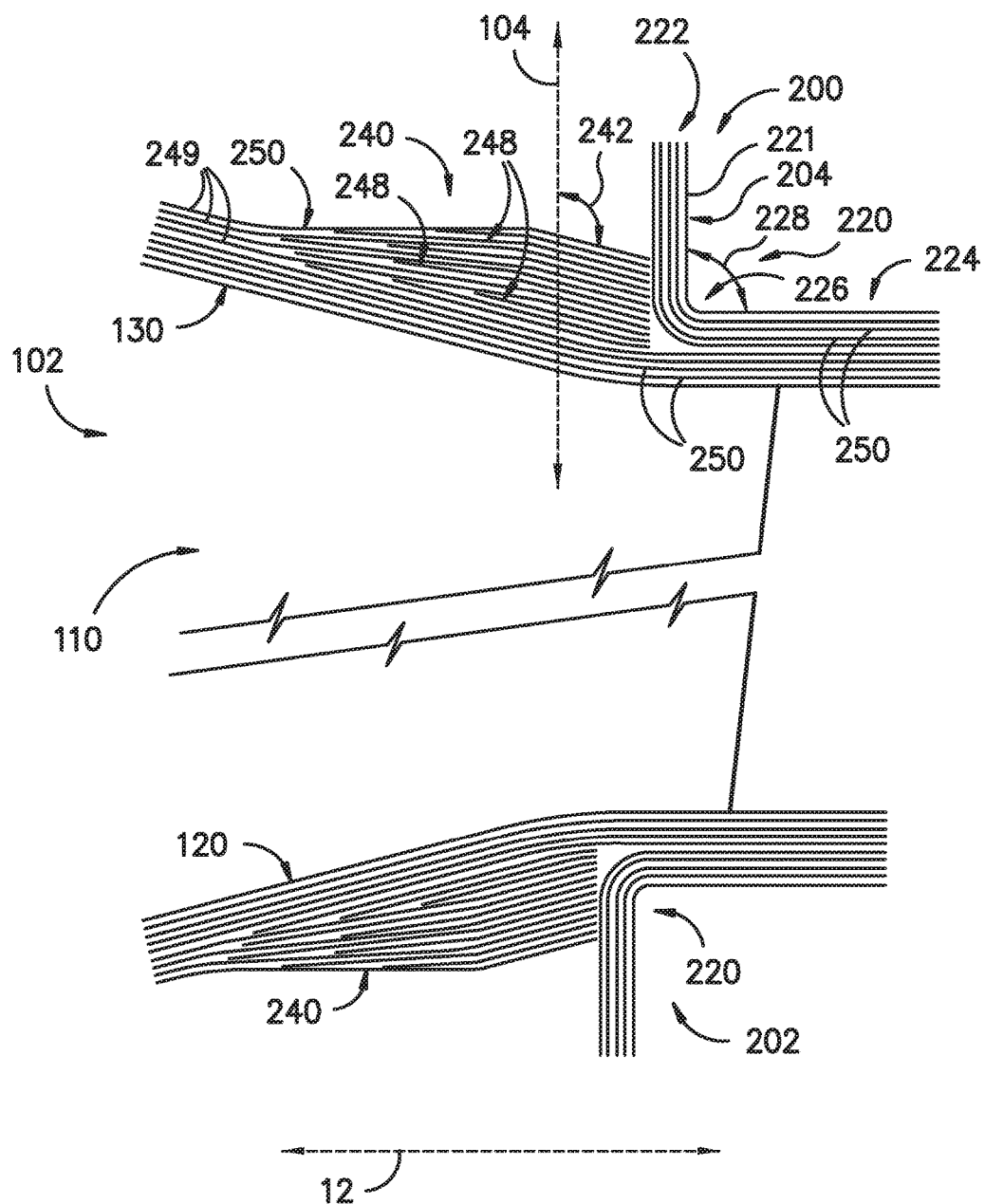
FIG. -10-

NOZZLE AND NOZZLE ASSEMBLY FOR GAS TURBINE ENGINE

FIELD OF THE INVENTION

The present subject matter relates generally to nozzles and nozzle assemblies for gas turbine engines. More particularly, the present subject matter relates to nozzles having improved load transmission features.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

Nozzles utilized in gas turbine engines, and in particular HP turbine nozzles, are often arranged as an array of airfoil-shaped vanes extending between annular inner and outer bands which define the primary flowpath through the nozzles. Due to operating temperatures within the gas turbine engine, it is generally desirable to utilize materials having a low coefficient of thermal expansion. Recently, for example, ceramic matrix composite ("CMC") materials have been utilized to operate effectively in such adverse temperature and pressure conditions. These low coefficient of thermal expansion materials have higher temperature capability than similar metallic parts, so that, when operating at the higher operating temperatures, the engine is able to operate at a higher engine efficiency.

However, CMC materials have mechanical properties that must be considered during the design and application of the CMC. For example, CMC materials have relatively low tensile ductility or low strain to failure when compared to metallic materials. Also, CMC materials have a coefficient of thermal expansion which differs significantly from metals, such as metal alloys, used as restraining supports or hangers for CMC materials. Therefore, if a CMC component is restrained and cooled on one surface during operation, stress concentrations can develop leading to a shortened life of the segment.

To date, nozzles formed of CMC materials have experienced localized stresses that have exceeded the capabilities of the CMC material, leading to a shortened life of the nozzle. The stresses have been found to be due to moment stresses imparted to the nozzle and associated attachment features, differential thermal growth between parts of differing material types, and loading in concentrated paths at the interface between the nozzle and the associated attachment features.

Accordingly, improved nozzles and nozzle assemblies are desired in the art. In particular, nozzles which include improved features for interfacing with mating features of support assemblies in gas turbine engines would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a nozzle for a gas turbine engine is provided. The nozzle includes an airfoil having an exterior surface defining a pressure side and a suction side extending between a leading edge and a trailing edge, an outer band disposed radially outward of the airfoil, the outer band including a radially outwardly-facing end surface, and an inner band disposed radially inward of the airfoil, the inner band including a radially inwardly-facing end surface. The nozzle further includes a flange extending radially from one of the radially outwardly-facing end surface or the radially inwardly-facing end surface. The flange is formed from a ceramic matrix composite material and includes a plurality of ceramic matrix composite plies stacked together and generally having an L-shape in a circumferential cross-sectional view.

In accordance with another embodiment of the present disclosure, a nozzle assembly for a gas turbine engine is provided. The nozzle assembly includes a nozzle and a nozzle support structure. The nozzle includes an airfoil having an exterior surface defining a pressure side and a suction side extending between a leading edge and a trailing edge, an outer band disposed radially outward of the airfoil, the outer band including a radially outwardly-facing end surface, and an inner band disposed radially inward of the airfoil, the inner band including a radially inwardly-facing end surface. The nozzle further includes a flange extending radially from one of the radially outwardly-facing end surface or the radially inwardly-facing end surface. The flange is formed from a ceramic matrix composite material and includes a plurality of ceramic matrix composite plies stacked together and generally having an L-shape in a circumferential cross-sectional view. The nozzle support structure includes a strut extending through the airfoil, the outer band of the nozzle and the inner band of the nozzle. The nozzle support structure further includes an outer hanger disposed radially outward of the airfoil, the outer hanger including a radially inwardly-facing end surface, and an inner hanger disposed radially inward of the airfoil, the inner hanger including a radially outwardly-facing end surface. The nozzle support structure further includes a flange extending radially from one of the radially outwardly-facing end surface or the radially inwardly-facing end surface, the flange configured to contact the flange of the nozzle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross-sectional view of a gas turbine engine in accordance with one embodiment of the present disclosure;

FIG. 2 is an enlarged circumferential cross sectional side view of a high pressure turbine portion of a gas turbine engine in accordance with one embodiment of the present disclosure;

FIG. 3 is a perspective partially exploded view of a plurality of nozzle assemblies in accordance with one embodiment of the present disclosure;

FIG. 4 is a circumferential cross-sectional of a nozzle assembly in accordance with one embodiment of the present disclosure;

FIG. 5 is a top perspective view of a portion of a nozzle in accordance with one embodiment of the present disclosure;

FIG. 6 is a circumferential cross-sectional view of an outer band, inner band, and associated flanges of a nozzle in accordance with one embodiment of the present disclosure;

FIG. 7 is a perspective view of a plurality of plies bent to form a flange of an inner or outer band of a nozzle in accordance with one embodiment of the present disclosure;

FIG. 8 is an exploded view of a plurality of plies utilized to form a flange of an inner or outer band of a nozzle in accordance with one embodiment of the present disclosure;

FIG. 9 is a circumferential cross-sectional view of an outer band, inner band, and associated flanges of a nozzle in accordance with another embodiment of the present disclosure; and FIG. 10 is a circumferential cross-sectional view of an outer band, inner band, and associated flanges of a nozzle in accordance with another embodiment of the present disclosure.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28.

As further shown in FIG. 2, the HP turbine may include one or more shroud assemblies, each of which forms an annular ring about an annular array of rotor blades. For example, a shroud assembly 72 may form an annular ring around the annular array 56 of rotor blades 58 of the first stage 50, and a shroud assembly 74 may form an annular ring around the annular array 66 of turbine rotor blades 68 of the second stage 60. In general, shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage from the hot gas path 70.

It should be noted that shrouds and shroud assemblies may additionally be utilized in a similar manner in the low pressure compressor 22, high pressure compressor 24, and/or low pressure turbine 30. Accordingly, shrouds and shrouds assemblies as disclosed herein are not limited to use in HP turbines, and rather may be utilized in any suitable section of a gas turbine engine.

Referring now to FIGS. 3 through 10, various embodiments of improved nozzle assemblies 100 and nozzles 102 therefor are disclosed. Nozzles 102 as disclosed herein may be utilized in place of stator vanes 54, stator vanes 64, or any other suitable stationary airfoil-based assemblies in an engine.

As shown in FIGS. 3 through 6, a nozzle 102 in accordance with the present disclosure includes an airfoil 110, which has outer surfaces defining a pressure side 112, a suction side 114, a leading edge 116 and a trailing edge 118. The pressure side 112 and suction side 114 extend between the leading edge 116 and the trailing edge 118, as is generally understood. In typical embodiments, airfoil 110 is generally hollow, thus allowing cooling fluids to be flowed therethrough and structural reinforcement components to be disposed therein.

Nozzle 102 can further include an inner band 120 and an outer band 130, each of which is connected to the airfoil 110 at radially outer ends thereof generally along a radial direction 104. Adjacent nozzles 102 in an array of nozzles 102 may be situated side by side along a circumferential direction 106, as shown, with neighboring surfaces of the inner bands 120 in contact and neighboring surfaces of the outer bands 130 in contact. Inner band 120 may be disposed radially inward of the airfoil 110, while outer band 130 may be disposed radially outward of the airfoil 110. Inner band 120 may include, for example, a radially inwardly-facing end surface 121 and a radially outwardly-facing end surface 122 which are spaced apart radially from each other. Inner band 120 may further include various side surfaces, including a pressure side slash face 124, suction side slash face 125, leading edge face 126 and trailing edge face 127. Similarly, outer band 130 may include, for example, a radially inwardly-facing end surface 131 and a radially outwardly-facing end surface 132 which are spaced apart radially from each other. Outer band 130 may further include various side surfaces, including a pressure side slash face 134, suction side slash face 135, leading edge face 136 and trailing edge face 137.

In exemplary embodiments, the airfoil 110, inner band 120 and outer band 130 may be formed from ceramic matrix composite ("CMC") materials. Alternatively, however, other suitable materials, such as suitable plastics, composites, metals, etc., may be utilized.

As further illustrated in FIG. 3, nozzle assembly 100 may include a nozzle support structure 108. Each support structure 108 may be coupled to a nozzle 102 to support the nozzle 102 in engine 10. Further support structure 108 may transmit loads from the nozzle 102 to various other components within the engine 10.

Support structure 108 may include, for example, a strut 140. Strut 140 may generally extend through the airfoil 110, such as generally radially through the interior of the airfoil 110. Strut 140 may further extend through the inner band 120 and the outer band 130, such as through bore holes (not labeled) therein. In general, strut 208 may carry loads between the radial ends of the nozzle 102 to other components of the support structure 108. The loads may be transferred through these components to other components of the engine 10, such as the engine casing, etc.

For example, support structure 108 may include an inner hanger 150 and an outer hanger 160, each of which is connected to strut 140 at radially outer ends thereof generally along radial direction 104. Adjacent support structures 108 in an array of support structures 108 may be situated side by side along circumferential direction 106, as shown, with neighboring surfaces of the inner hangers 150 in contact and neighboring surfaces of the outer hangers 150 in contact. Inner hanger 150 may be disposed radially inward of the strut 140, while outer hanger 160 may be disposed radially outward of the strut 140. Further, inner hanger 150 may be positioned generally radially inward of the airfoil 110 and inner band 120. Outer hanger 160 may be positioned generally radially outward of the airfoil 110 and outer band 130. Inner hanger 150 may include, for example, a radially inwardly-facing end surface 151 and a radially outwardly-facing end surface 152 which are spaced apart radially from each other. Inner hanger 150 may further include various side surfaces, including a pressure side slash face 154, suction side slash face 155, leading edge face 156 and trailing edge face 157. Similarly, outer hanger 160 may include, for example, a radially inwardly-facing end surface 161 and a radially outwardly-facing end surface 162 which are spaced apart radially from each other. Outer hanger 160 may further include various side surfaces, including a pressure side slash face 164, suction side slash face 165, leading edge face 166 and trailing edge face 167.

In exemplary embodiments, the strut 140, inner hanger 150 and outer hanger 160 are formed from metals. Alternatively, however, other suitable materials, such as suitable plastics, composites, etc., may be utilized.

As discussed, nozzles 102 may be subjected to various loads during operation of the engine 10, including loads along an axial direction (as defined along the centerline 12). Further, as discussed, differences in the materials utilized to form a nozzle 102 and associated support structure 108 (i.e. CMC and metal, respectively, in exemplary embodiments) may cause undesirable relative movements of the nozzle 102 and/or support structure 108 during engine operation, in particular along the radial direction 104. It is generally desirable to improve the load transmission between the associated nozzle 102 and support structure 108 and reduce the risk of damage to the component of the nozzle 102 that interface with the support structure 108 due to such loading and relative movement.

Accordingly, and referring now to FIGS. 3 through 6, a nozzle 102 in accordance with the present disclosure may further include one or more flanges 200, 202 which are utilized to transmit loads between the associated nozzle 102 and support structure 108. Each flange 200, 202 of a nozzle 102 is formed from a CMC material and extends radially outward from the radially outwardly facing end surface 132 of the outer band 130 or radially inward from the radially inwardly facing end surface 121 of the inner band 120. In exemplary embodiments, a nozzle 102 includes a plurality of flanges 200, 202. At least one first flange 200 may extend radially outward from the radially outwardly facing end surface 132 and at least one second flange 202 may extend radially inward from the radially inwardly facing end surface 121.

Each flange 200, 202 may be configured to contact a mating flange 210, 212 of the nozzle support structure 108 or another suitable component within engine 10. Such contact may occur in the engine 10 when assembled and during operation of the engine 10. For example, in exemplary embodiments, a nozzle support structure 108 in accordance with the present disclosure may further include one or more flanges 210, 212 which are utilized to transmit loads between the associated nozzle 102 and support structure 108. Each flange 210, 212 of a nozzle support structure 108 may, in exemplary embodiments, be formed from metal material or other suitable material. Further, each flange 210, 212 of a nozzle support structure 108 extends radially inward from the radially inwardly facing end surface 161 of the outer hanger 160 or radially outward from the radially outwardly facing end surface 152 of the inner hanger 150. In exemplary embodiments, a nozzle support structure 108 includes a plurality of flanges 210, 212. At least one first flange 210 may extend radially inward from the radially inwardly facing end surface 161 and at least one second flange 212 may extend radially outward from the radially outwardly facing end surface 152.

Each flange 200, 202 may, for example, include a load transmission face 204 which contacts a mating load transmission face 214 of flange 202. Loads may generally be transmitted between the nozzle 102 and nozzle support structure 108 through these faces 204, 214. In exemplary embodiments, the face 214 of a flange 200, 202 may be generally orthogonal to the axial direction (along the centerline 12). Mating face 214 may similarly be generally orthogonal to the axial direction. Accordingly, loads may be transmitted generally along the axial direction between the nozzle 102 and nozzle support structure 108.

Flanges 200, 202 in accordance with the present disclosure are, as discussed, formed from a CMC material. In particular, and referring now to FIGS. 6 through 10, such flanges 200, 202 are formed from a plurality of CMC plies. The plies are advantageously arranged in particular orientations to facilitate load transmission and prevent damage to the flanges 200, 202 due to wear, etc. during engine 10 operation. For example, flanges 200, 202 may contact mating flanges 210, 212 as discussed. Further the associated flanges 200, 202 and 210, 212 may move radially with respect to one another during operation due to differences in coefficients of thermal expansion in the nozzle 102 and nozzle support structure 108. Accordingly, wear can occur on the flanges 200, 202, and particularly on the faces 204 thereof, due to rubbing against the flanges 210, 212, etc. The orientation of the CMC plies utilized to form flanges 200, 202 may reduce the risk of damage to the flanges 200, 202 due to such contact, rubbing, etc.

For example, a flange 200, 202 may include a first plurality of ceramic matrix composite plies 220 which are stacked together and generally have an L-shape in a circumferential cross-sectional view, as shown in FIGS. 6 and 7. The L-shaped stack of plies generally includes a first end portion 222, a second end portion 224, and a bent portion 226 disposed between the first end portion 222 and second end portion 224. An angle 228 may be defined between the first end portion 222 and second end portion 224. The angle 228 may be between approximately 80 degrees and approximately 100 degrees, such as between approximately 85 degrees and approximately 95 degrees, such as between approximately 88 degrees and approximately 92 degrees, such as approximately 90 degrees. The angle 228 between the first end portion 222 and second end portion 224 generally defines the stack of plies as an L-shaped stack of plies.

Further, in exemplary embodiments, the first plurality of CMC plies 220 may be oriented to facilitate load transmission and reduce wear in particular directions. For example, the first plurality of plies 220 may be bent such that a portion (the first end portion 222) of the first plurality of plies 220 is stacked generally along the axial direction 12 and a portion (the second end portion 224) of the first plurality of plies 220 is stacked generally along the radial direction 104.

The first plurality of plies 220 may include and define the load transmission face 204 of the flange 200, 202. For example, an outermost, exposed ply 221 of the first plurality of plies 220 may define the load transmission face 204. In particular, the portion of this ply 221 which is in the first end portion 222 may define the load transmission face 204. In addition to the orientation of the plies 220 as discussed herein, this ply 221 may advantageously provide wear resistant qualities to the flange 200, 202. For example, the CMC material of ply 221 may include a plurality of generally unidirectionally oriented continuous fibers 232 embedded in a ceramic matrix 234. Continuous fibers generally extend through an entire length of a ply, as opposed to discontinuous fibers which extend through only a portion of a length of a ply. The fibers 232 may be formed from ceramic, carbon, glass or other suitable materials. In exemplary embodiments, a portion (the first end portion 222) of the plurality of generally unidirectionally oriented continuous fibers 232 may extend generally in the radial direction 104. Accordingly, when the flanges 200, 202 and flanges 210, 212 move along the radial axis relative to one another, rubbing, etc., generally occurs along the length of the fibers 232. This orientation of the fibers 232 thus reduces wear in the flanges 200, 202 during operation. Notably, it should be understood that fibers 232 may be oriented in any suitable direction, and may particularly be oriented in any suitable direction along which rubbing, etc., may occur to thus reduce potential wear.

A flange 200, 202 may additionally include a second plurality of CMC plies 240. The second plurality of plies 240 may generally reinforce the first plurality of plies 220, and may advantageously distribute loads transmitted to the flange 200, 202 through the first plurality of plies 220. The second plurality of plies 240 may be stacked together and may contact the first plurality of plies 220. Further, at least a portion of the second plurality of plies 240 may generally taper from the first plurality of plies 220 towards the one of the radially outwardly-facing end surface 122 or the radially inwardly-facing end surface 121 that the flange 200, 202 extends from, such as taper along the axial direction (along centerline 12). In exemplary embodiments as shown, at least a portion of the plurality of plies 240 may be stacked along an angle 242 between the radial direction 104 and the axial direction (along centerline 12). Angle 242 can be, for example, between approximately 35 degrees and approximately 55 degrees from the radial direction 104, such as between approximately 40 degrees and approximately 50 degrees from the radial direction 104. At least a portion of the second plurality of plies 240 is thus generally wedge shaped, and utilizes this shape to transfer loads between the first plurality of plies 220 and the one of the radially outwardly-facing end surface 122 or the radially inwardly-facing end surface 121.

FIG. 8 illustrates an exploded view of a plurality of plies 250 utilized to form the first plurality of plies 220 or second plurality of plies 240. Each ply includes a plurality of fibers 232 embedded in a ceramic matrix 234, as discussed. In exemplary embodiments, the fibers 232 in each ply are continuous fibers. Further, neighboring plies 240 may have any suitable orientations relative to one another. For example, FIG. 8 illustrates plies 250 having a 0 degree/90 degree orientation relative to the radial direction 104. Alternatively, plies 250 may have a −45 degree/45 degree orientation relative to the radial direction 104, a 0 degree/90 degree/45 degree/−45 degree orientation relative to the radial direction 104, or any other suitable orientation relative to each other and a reference axis or direction.

It should be noted that, while continuous fibers 232 are preferably utilized for the first plurality of plies 220, the first and second pluralities of plies 220, 240 are not limited to continuous fibers. Any suitable fibers, include continuous fibers or discontinuous fibers having any suitable specified or random orientations within a ply, are within the scope and spirit of the present disclosure.

Referring now briefly to FIGS. 6, 9 and 10, various embodiments of the second plurality of plies 240 are illustrated. FIG. 6 illustrates an embodiment wherein the second plurality of plies 240 is stacked generally along angle 242. FIG. 9 illustrates an embodiment wherein one or more plies 250 of the second plurality of plies 240 include a first portion 244 stacked generally along angle 242 and a second portion 246 stacked generally along the axial direction 12. This second portion may, for example and as shown, abut with the first portion 222 of the first plurality of plies 220. FIG. 10 illustrates an embodiment wherein the second plurality of plies 240 includes one or more packs 248 of plies 250. A pack 248 of plies 250 may include a plurality of plies 250 which are pre-assembled to form the pack 248. As shown, in some embodiments, one or more individual plies 250 may additionally be utilized to divide various packs 248 from each other. These plies 250 may further, in some embodiments, include portions 249 which become assembled with and thus part of the inner band 120 or outer band 130.

It should further be understood that the present disclosure is not limited to the above described embodiments of the second plurality of plies 240, and rather that any suitable arrangement of the second plurality of plies 240 to generally reinforce the first plurality of plies 220 and distribute loads transmitted to the flange 200, 202 through the first plurality of plies 220 is within the scope and spirit of the present disclosure.

Still further, it should be understood that any suitable orientations of the plies forming various component such as first portion 220, second portion 240, inner band 120 and/or outer band 130 may be utilized. The orientations may be the same from component to component, or may be different, as desired or required.

The present disclosure is further directed to methods for assembling nozzle assemblies 100. A method may include, for example, coupling a nozzle support structure 108 to a nozzle 102. Such coupling may include, for example, extending a strut 140 through a nozzle 102, such as through the airfoil 110, inner band 120, and outer band 130. Such coupling may further include, for example, connecting the strut 140 to an inner hanger 150 and/or outer hanger 160 after the strut 140 is extended through the nozzle 102. When assembled, one or more flanges of 200, 202 of the nozzle 102 and one or more flanges 210, 212 of the nozzle support structure 108 may be configured to contact each other, as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A nozzle for a gas turbine engine, the nozzle comprising:
   an airfoil having an exterior surface defining a pressure side and a suction side extending between a leading edge and a trailing edge;
   an outer band disposed radially outward of the airfoil, the outer band comprising a radially outwardly-facing end surface;
   an inner band disposed radially inward of the airfoil, the inner band comprising a radially inwardly-facing end surface; and
   a flange extending radially from one of the radially outwardly-facing end surface or the radially inwardly-facing end surface, the flange formed from a ceramic matrix composite material and comprising a first plurality of ceramic matrix composite plies stacked together and generally having an L-shape in a circumferential cross-sectional view, wherein the flange defines a radially-extending load transmission face, the first plurality of ceramic matrix composite plies is bent such that a portion of the first plurality of ceramic matrix composite plies is stacked generally along the radial direction and a portion of the first plurality of ceramic matrix composite plies is stacked generally along the axial direction with a bent portion therebetween, and the portion of the first plurality of ceramic matrix composite plies which is stacked generally along the radial direction extends axially from the load transmission face toward the trailing edge;
   wherein the flange further comprises a second plurality of ceramic matrix composite plies stacked together, at least a portion of the second plurality of ceramic matrix composite plies generally tapering from the first plurality of plies towards the one of the radially outwardly-facing end surface or the radially inwardly-facing end surface; and
   wherein at least a portion of the second plurality of ceramic matrix composite plies is stacked along an angle between the radial direction and the axial direction.

2. The nozzle of claim 1, wherein the load transmission face is generally orthogonal to an axial direction.

3. The nozzle of claim 2, wherein the ply of the first plurality of plies which defines the load transmission face comprises a plurality of generally unidirectionally oriented continuous fibers, at least a portion of the plurality of generally unidirectionally oriented continuous fibers extending generally in the radial direction.

4. The nozzle of claim 1, wherein the flange extends from the radially outwardly-facing end surface.

5. The nozzle of claim 1, wherein the flange extends from the radially inwardly-facing end surface.

6. The nozzle of claim 1, wherein the flange is a first flange extending from the radially outwardly-facing end surface, and further comprising a second flange extending from the radially inwardly-facing end surface.

7. The nozzle of claim 1, wherein the airfoil, outer band and inner band are formed from a ceramic matrix composite material.

8. A nozzle assembly for a gas turbine engine, the nozzle assembly comprising:
   a nozzle, the nozzle comprising:
      an airfoil having an exterior surface defining a pressure side and a suction side extending between a leading edge and a trailing edge;
      an outer band disposed radially outward of the airfoil, the outer band comprising a radially outwardly-facing end surface;
      an inner band disposed radially inward of the airfoil, the inner band comprising a radially inwardly-facing end surface; and
      a flange extending radially from one of the radially outwardly-facing end surface of the outer band or the radially inwardly-facing end surface of the inner band, the flange formed from a ceramic matrix composite material and comprising a first plurality of ceramic matrix composite plies stacked together and generally having an L-shape in a circumferential cross-sectional view, wherein the flange defines a radially-extending load transmission face, the first plurality of ceramic matrix composite plies is bent such that a portion of the first plurality of ceramic matrix composite plies is stacked generally along the radial direction and a portion of the first plurality of ceramic matrix composite plies is stacked generally along the axial direction with a bent portion therebetween, and the portion of the first plurality of ceramic matrix composite plies which is stacked generally along the radial direction extends axially from the load transmission face toward the trailing edge;
   wherein the flange further comprises a second plurality of ceramic matrix composite plies stacked together, at least a portion of the second plurality of ceramic matrix composite plies generally tapering from the first plurality of plies towards the one of the radially outwardly-facing end surface or the radially inwardly-facing end surface; and
   wherein at least a portion of the second plurality of ceramic matrix composite plies is stacked along an angle between the radial direction and the axial direction; and
   a nozzle support structure, the nozzle support structure comprising:
      a strut extending through the airfoil, the outer band of the nozzle and the inner band of the nozzle;
      an outer hanger disposed radially outward of the airfoil, the outer hanger comprising a radially inwardly-facing end surface;
      an inner hanger disposed radially inward of the airfoil, the inner hanger comprising a radially outwardly-facing end surface; and
      a mating flange extending radially from one of the radially outwardly-facing end surface of the inner hanger or the radially inwardly-facing end surface of the outer hanger, the mating flange configured to contact the flange of the nozzle.

9. The nozzle assembly of claim 8, wherein the load transmission face is generally orthogonal to an axial direction.

10. The nozzle assembly of claim 8, wherein the flange of the nozzle extends from the radially outwardly-facing end surface of the nozzle.

11. The nozzle assembly of claim 8, wherein the flange of the nozzle extends from the radially inwardly-facing end surface of the nozzle.

12. The nozzle assembly of claim 8, wherein the flange of the nozzle is a first flange extending from the radially outwardly-facing end surface of the nozzle, and wherein the nozzle further comprises a second flange extending from the radially inwardly-facing end surface of the nozzle.

13. The nozzle assembly of claim 8, wherein the airfoil, outer band and inner band are formed from a ceramic matrix composite material.

14. The nozzle assembly of claim 8, wherein the strut, outer hanger, inner hanger and mating flange of the support structure are formed from a metal.

\* \* \* \* \*